United States Patent [19]

Harada et al.

[11] Patent Number: 4,952,013
[45] Date of Patent: Aug. 28, 1990

[54] OPTICAL WAVELENGTH CONVERTER DEVICE

[75] Inventors: Akinori Harada; Yoji Okazaki; Koji Kamiyama; Shinsuke Umegaki, all of Kanagawa, Japan

[73] Assignee: Fuji Photo Film Co., Ltd., Kanagawa, Japan

[21] Appl. No.: 328,266

[22] Filed: Mar. 24, 1989

[30] Foreign Application Priority Data

Mar. 25, 1988 [JP] Japan ............................ 63-72752
Mar. 25, 1988 [JP] Japan ............................ 63-72753

[51] Int. Cl.$^5$ .............................................. G02B 6/10
[52] U.S. Cl. ................................ 350/96.3; 350/96.12
[58] Field of Search .................. 350/96.12, 96.14, 96.3, 350/96.34; 307/425–430

[56] References Cited

U.S. PATENT DOCUMENTS

| | | | |
|---|---|---|---|
| 3,965,375 | 6/1976 | Bergman, Jr. et al. | 307/425 |
| 4,124,270 | 11/1978 | Cheo | 350/96.12 |
| 4,165,469 | 8/1979 | Ammann | 307/426 |
| 4,221,981 | 9/1980 | Deserno | 307/425 |
| 4,515,429 | 5/1985 | Smith et al. | 350/96.13 |
| 4,763,019 | 8/1988 | Diguay et al. | 307/427 |
| 4,812,682 | 3/1989 | Holmes | 307/425 |
| 4,820,011 | 4/1989 | Umegaki et al. | 350/96.19 |
| 4,826,283 | 5/1989 | Chuangtian et al. | 350/96.12 |
| 4,830,447 | 5/1989 | Kamiyama et al. | 350/96.12 |
| 4,838,638 | 6/1989 | Kamiyama et al. | 350/96.19 |

*Primary Examiner*—William L. Sikes
*Assistant Examiner*—John Ngo
*Attorney, Agent, or Firm*—Sughrue, Mion, Zinn, MacPeak & Seas

[57] ABSTRACT

An optical wavelength converter device of the optical fiber type comprises a core made of a nonlinear optical material and cladding of an amorphous material and surrounding the core, the cladding having a refractive index lower than the refractive index of the core. Another optical wavelength converter device comprises a two- or three-dimensional optical wavelength converter device produced by growing a nonlinear optical material crystal as an optical waveguide on or in an amorphous substrate having a refractive index lower than the refractive index of the nonlinear optical material crystal. Phase matching is achieved between a radiation mode of a wavelength-converted wave in the cladding or the substrate and a nonlinear polarized wave generated by a waveguide mode of first and second fundamental waves in the core or the optical waveguide.

12 Claims, 4 Drawing Sheets

OPTICAL WAVELENGTH CONVERTER DEVICE

BACKGROUND OF THE INVENTION

1. Field of the Invention

The present invention relates to an optical wavelength converter device, and more particularly to an optical wavelength converter device for converting two fundamental waves of different wavelengths applied to the device into a wave having a frequency equal to the sum of the frequencies of the fundamental waves, a wave having a frequency equal to the difference between the frequencies of the fundamental waves, or two or more of wavelength-converted waves respectively having the sum frequency, the differential frequency, and a second harmonic.

2. Description of the Prior Art

Various attempts have heretofore been made for applying light as a fundamental wave to a nonlinear optical material to convert the fundamental wave to a second harmonic having a wavelength which is ½ of the wavelength of the fundamental wave. It has also been attempted to apply two fundamental waves having different wavelengths $\lambda_1$, $\lambda_2$ to produce a wave having a wavelength $\lambda_3$ and a sum frequency $(1/\lambda_3 = 1/\lambda_1 + 1/\lambda_2)$ or a wave having a wavelength $\lambda_3$ and a differential frequency $(1/\lambda_3 = 1/\lambda_1 - 1/\lambda_2)$. Examples of such optical wavelength converter devices using a nonlinear optical material for wavelength conversion include an optical wavelength converter device of the bulk crystal type and an optical wavelength converter device of the three-dimensional waveguide type which is disclosed in page 1234 and following pages of "OYO BUTURI" (a monthly publication of the Japan Society of Applied Physics), Vol. 49 (1980).

With the optical wavelength converter device of the bulk crystal type, however, the power density of fundamental waves to be applied to the device cannot be increased sufficiently, and the interaction length of the device cannot be large in view of the requirements for extracting a converted wave. Therefore, the efficiency of wavelength conversion is very low.

The optical wavelength converter device of this type is designed to achieve phase matching between the fundamental waves and the converted wave by utilizing the birefringence of a crystal. The condition for achieving the phase matching is indicated by:

$$|K_1| \pm |K_2| = |K_3|$$

where $|K_1|$, $|K_2|$ represents the wave number vectors of first and second fundamental waves, and $|K_3|$ the wave number vector of a wave with a sum or differential frequency. Assuming that the refractive index of the device for the first fundamental wave in the direction of polarization is indicated by $n_1$, $$||K_1|| = (2\pi n_1)/\lambda_1,$$

and likewise, $$||K_2|| = (2\pi n_2)/\lambda_2,$$

$$||K_3|| = (2\pi n_3)/\lambda_3,$$

$(\lambda_1 < \lambda_2)$. In order to meet the foregoing phase matching condition, it is necessary that the refractive indexes $n_1$, $n_2$ (in the direction of polarization of the second fundamental wave) and the refractive index $n_3$ (in the direction of polarization of the converted wave) be of desired values with respect to the wavelengths $\lambda_1$, $\lambda_2$, $\lambda_3$. Therefore, the optical wavelength converter device can be used only in a highly limited range of wavelengths.

There has been reported only one example of an optical wavelength converter device of the three-dimensional waveguide type, in which a substrate is made of $LiNbO_3$ and a wave having a differential frequency is produced from two fundamental waves with different frequencies. The condition for achieving phase matching between the applied fundamental waves is expressed by:

$$\frac{n_{eff}^{\omega 3}}{\lambda_3} = \frac{n_{eff}^{\omega 1}}{\lambda_1} - \frac{n_{eff}^{\omega 2}}{\lambda_2}$$

$(\lambda_1 < \lambda_2)$ where $n_{eff}^{\omega 1}$, $n_{eff}^{\omega 2}$ represent the effective refractive indexes of the optical waveguide with respect to the first and second fundamentals, and $n_{eff}^{\omega 3}$ the effective refractive index of the optical waveguide with respect to the wave with the differential frequency. Unlike the bulk-crystal-type optical wavelength converter device, it is possible to increase the power density of the fundamental waves applied to the optical wavelength converter device of the three-dimensional waveguide type. It has been theoretically shown that using a device having a length of 1 cm, a wavelength conversion efficiency of a few % can be achieved with an input power of 100 mW. Nevertheless, since the above phase matching condition cannot be satisfied unless the temperature of the device is controlled with an accuracy of 0.1° C. or less, the optical wavelength converter device of this type has not yet been put to use.

In order to obtain a converted wave having a desired wavelength (and a differential frequency), it is necessary to control the refractive indexes of the optical waveguide. In the optical wavelength converter device of this type employing a substrate of $LiNbO_3$, however, the refractive indexes can only be controlled by a diffusion process or a proton exchange, and hence the degree of freedom available in designing the optical waveguide is low.

According to the one known example of the optical wavelength converter device of the three-dimensional waveguide type, which was mentioned above, only a wave having a differential frequency is extracted. No optical wavelength converter device of the bulk crystal type has been proposed which can simultaneously produce waves having second harmonics of two respective fundamentals, or which can simultaneously produce one or both of the waves having second harmonics and one or both of waves having sum and differential frequencies.

SUMMARY OF THE INVENTION

In view of the aforesaid drawbacks of the conventional optical wavelength converter devices, it is an object of the present invention to provide an optical wavelength converter device which can be designed with a high degree of freedom, and can produce a highly intensive wave having a sum frequency or a differential frequency or highly intensive waves having sum and differential frequencies simultaneously.

Another object of the present invention is to provide an optical wavelength converter device which can simultaneously produce a wave having a sum frequency and/or a wave having a differential frequency, and one or both of waves having second harmonics from two fundamental waves, and which can simultaneously produce waves having second harmonics of two fundamentals.

According to the present invention, an optical wavelength converter device of the optical fiber type comprises a core made of a nonlinear optical material and cladding of an amorphous material and surrounding the core, the cladding having a refractive index lower than the refractive index of the core. More specifically, the optical wavelength converter device of the present invention is of the Cherenkov radiation type in which phase matching is achieved between a wavelength-converted wave radiated into the cladding and travelling in a radiation mode and a nonlinear polarized wave generated by travelling through fundamental waves in the core in a waveguide mode, and in which the first and second fundamental waves having different wavelengths are applied to the core and radiated into the cladding.

Another optical wavelength converter device according to the present invention comprises a two- or three-dimensional optical wavelength converter device produced by growing a nonlinear optical material crystal on or in an amorphous substrate having a refractive index lower than the refractive index of the nonlinear optical material crystal. More specifically, the optical wavelength converter device is of the Cherenkov radiation type in which phase matching is achieved between a wavelength-converted wave radiated into the substrate and travelling into a radiation mode and a nonlinear polarized wave generated by fundamental waves travelling through an optical waveguide, in a waveguide mode, and in which the first and second fundamental waves having different wavelengths are applied to the optical waveguide and radiated into the substrate.

With the above arrangement, the optical wavelength converter device can produce, as wavelength-converted waves, a wave having a sum frequency, a wave having a differential frequency, waves having sum and differential frequencies, waves having second harmonics of first and second fundamentals, one or both of the waves having sum and differential frequencies and the wave having the second harmonic of one of the fundamentals, or one or both of the waves having sum and differential frequencies and the waves having the second harmonics of the first and second fundamentals, and can accomplish phase matching between these wavelength converted waves and fundamental waves.

The conditions for achieving phase matching in the optical wavelength converter device will be described below. While the following description applies to the optical wavelength converter device of the optical fiber type, it also applies to optical wavelength converter devices of the two- or three-dimensional optical waveguide type insofar as phase matching is concerned. Therefore, the following description is readily applicable to the optical wavelength converter device of the two- or three-dimensional optical waveguide type by reading "cladding" and "core" in the description as "substrate" and "optical waveguide", respectively.

The condition for achieving phase matching as described above with respect to a wave having a sum frequency is as follows:

$$\frac{n_{clad}^{\omega1+\omega2}}{\lambda_3} \cos\theta^{\omega1+\omega2} = \frac{n_{eff}^{\omega1}}{\lambda_1} + \frac{n_{eff}^{\omega2}}{\lambda_2} \quad (1)$$

where $\lambda_1$, $\lambda_2$ represent the wavelengths of first and second fundamental waves, $\lambda_3$ the wavelength of a wavelength-converted wave, $\omega_1$ the angular frequency of the fundamental wave having the wavelength $\lambda_1$, $\omega_2$ the angular frequency of the fundamental having the wavelength $\lambda_2$, $n_{clad}^{\omega1+\omega2}$ the refractive index of the cladding with respect to the wave with the sum frequency, $\theta^{\omega1+\omega2}$ the angle (phase matching angle) at which the wave with the sum frequency is radiated into the cladding, and $n_{eff}^{\omega1}$, $n_{eff}^{\omega2}$ the effective refractive indexes of the core with respect to the first and second fundamental waves, respectively. The condition for achieving phase matching with respect to a wave having a differential frequency is given by:

$$\frac{n_{clad}^{\omega1-\omega2}}{\lambda_3} \cos\theta^{\omega1-\omega2} = \frac{n_{eff}^{\omega1}}{\lambda_1} - \frac{n_{eff}^{\omega2}}{\lambda_2} \quad (2)$$

where $n_{clad}^{\omega1+\omega2}$ represents the refractive index of the cladding with respect to the wave with the differential frequency, and $\theta^{\omega1+\omega2}$ the angle (phase matching angle) at which the wave with the differential frequency is radiated into the cladding.

The condition for achieving phase matching with respect to the second harmonic of the first fundamental is as follows:

$$n_{clad}^{2\omega1} \cos\theta^{2\omega1} = n_{eff}^{\omega1} \quad (3)$$

where $n_{clad}^{2\omega1}$ represents the refractive index of the cladding with respect to this second harmonic, and $\theta^{2\omega1}$ the angle (phase matching angle) at which the wave with this second harmonic is radiated into the cladding. The condition for achieving phase matching with respect to the second harmonic of the second fundamental is as follows:

$$n_{clad}^{2\omega2} \cos\theta^{2\omega2} = n_{eff}^{\omega2} \quad (4)$$

where $n_{clad}^{2\omega2}$ represents the refractive index of the cladding with respect to this second harmonic, and $\theta^{2\omega2}$ the angle (phase matching angle) at which the wave with this second harmonic is radiated into the cladding.

Since the radiation mode of the wavelength-converted wave radiated into the cladding has a continuous spectrum, i.e., the radiation angle may be of any desired value, the above conditions (1) through (4) can simultaneously be met with the refractive indexes $n_{clad}^{\omega1+\omega2}$, $n_{clad}^{\omega1-\omega2}$, $n_{clad}^{2\omega1}$, $n_{clad}^{2\omega2}$ of the cladding and the effective refractive indexes $n_{eff}^{\omega1}$, $n_{eff}^{\omega2}$ being selectable with a large freedom. More specifically, assuming that the phase matching angle is generally indicated by $\theta$, since $$\cos\theta < 1,$$

phase matching can be achieved only if $$\frac{n_{clad}^{\omega1+\omega2}}{\lambda_3} > \frac{n_{eff}^{\omega1}}{\lambda_1} + \frac{n_{eff}^{\omega2}}{\lambda_2}$$

for the equation (1), phase matching can be achieved only if $$\frac{n_{clad}^{\omega 1-\omega 2}}{\lambda_3} > \frac{n_{eff}^{\omega 1}}{\lambda_1} + \frac{n_{eff}^{\omega 2}}{\lambda_2}$$

$(\lambda_1 < \lambda_2)$ for the equation (2), phase matching can be achieved only if $$n_{clad}^{2\omega 1} > n_{eff}^{\omega 1}$$

for the equation (3), and phase matching can be achieved only if $$n_{clad}^{2\omega 2} > n_{eff}^{\omega 2}$$

for the equation (4).

A plurality of wavelength-converted waves can simultaneously be extracted if the refractive indexes $n_{clad}^{\omega 1+\omega 2}$, $n_{clad}^{\omega 1-\omega 2}$, $n_{clad}^{2\omega 1}$, $n_{clad}^{2\omega 2}$ and effective refractive indexes $n_{eff}^{\omega 2}$, $n_{eff}^{\omega 2}$ simultaneously satisfy two or more of the equations (1) through (4) above. The optical wavelength converter device of the present invention is capable of simultaneously extracting a plurality of wavelength-converted waves since the cladding is made of an amorphous material. That is, where the cladding is made of glass, inasmuch as the refractive index of glass is in a wide range of from 1.4 to 1.9 (with respect to a sodium d-line having a wavelength of 587.6 nm), and the refractive index varies dependent on the wavelength in a wide range of $\nu d = 20 \sim 85$, it is possible to form cladding which can satisfy two or more of the conditions (1) through (4). The effective indexes $n_{clad}^{\omega 1}$, $n_{clad}^{\omega 2}$ are determined solely by the diameter of the core (the thickness of the waveguide of the optical-waveguide-type device) once the refractive index of the cladding and the wavelengths of the fundamentals are selected. However, since the refractive index of the cladding and the wavelength-dependent refractive index dispersion can be selected with greater freedom, desired effective indexes can be attained without accurately controlling the core diameter and by freely varying the core diameter.

To accomplish high wavelength conversion efficiency, the first and second fundamental waves are required to be guided in a single mode. Such a requirement can be met by using an amorphous material for the cladding (the substrate of the optical wavelength converter device of the two- or three-dimensional optical waveguide type). (Terms appearing in parentheses below denote components of the optical wavelength converter device of the two- or three-dimensional optical waveguide type.) More specifically, since the wavelength-dependent refractive index dispersion of an amorphous material can be of a value in a wide range, as described above, it is possible to select a cladding (substrate) material which has the same wavelength-dependent refractive index dispersion as that of the core (optical waveguide) material, as shown in FIG. 5. As a result, the difference $\Delta n_1$ between the refractive indexes of the core (optical waveguide) and the cladding (substrate) with respect to the wavelength $\lambda_1$ of the first fundamental wave is made substantially equal to the difference $\Delta n_1$ between the core (optical waveguide) and the cladding (substrate) with respect to the wavelength $\lambda_2$ of the second fundamental wave. Therefore, as can be seen from mode dispersion curves in FIG. 6, the core diameter (waveguide thickness) which can guide light having a wavelength $\lambda_1$ and light having a wavelength $\lambda_2$ can easily be selected. Denoted at $n_{core}$ in FIG. 6 is the refractive index of the core.

Since the refractive index of the cladding (substrate) can be selected with increased freedom, a mode field diameter with respect to the wavelengths $\lambda_1$, $\lambda_2$ can be also selected with increased freedom. Accordingly, the application of light to the device can be facilitated by not extremely reducing the mode field diameter.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
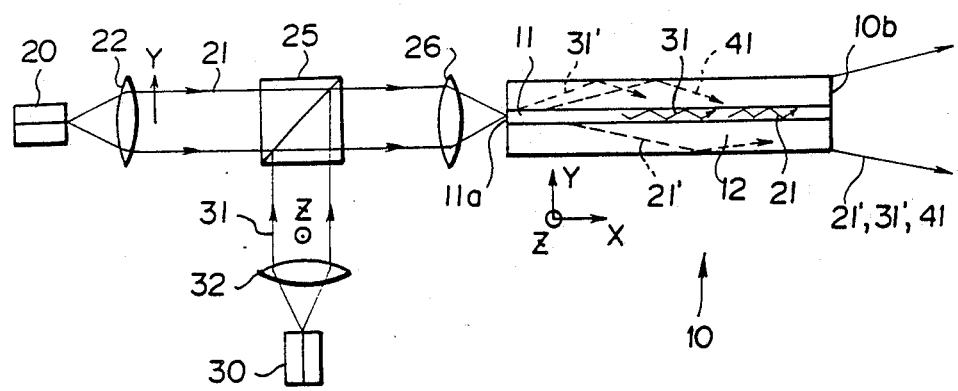
FIG. 1 is a schematic side elevational view of an optical wavelength converter device of the optical fiber type according to an embodiment of the present invention.
Figure 2:
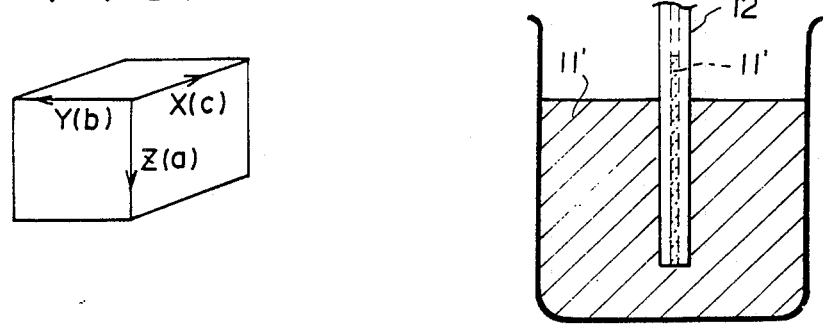
FIG. 2 is a schematic view showing a bulk crystal structure of a core material used in the optical wavelength converter device shown in FIG. 1.

FIGS. 1 shows an optical wavelength converter device 10 according to an embodiment of the present invention. The optical wavelength converter device 10 comprises an optical fiber including a core 11 filled in a hollow space defined centrally in cladding 12, the cladding 12 having a refractive index lower than that of the core 12. The optical wavelength converter device 10 is arranged to produce wavelength-converted waves of three colors, i.e., red, green, and blue in response to a first fundamental wave having a wavelength of 1300 nm and a second fundamental wave having a wavelength of 800 nm which are applied to the device 10. The core 11 is made of a monocrystalline nonlinear optical material (3,5-dimethyl-1-(4-nitrophenyl) pyrazole: hereinafter referred to as "PRA") represented by the following molecular diagram:

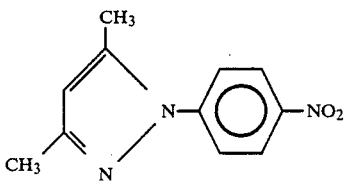

and the PRA of the core 11 has a crystal orientation with its c-axis extending substantially along the longitudinal axis of the core 11. FIG. 2 shows a bulk crystal structure of PRA. The PRA crystal is of an orthorhombic system, and its point group is mm2. Therefore, the tensor of the nonlinear optical constants is as follows:

$$d = \begin{pmatrix} 0 & 0 & 0 & 0 & d_{15} & 0 \\ 0 & 0 & 0 & d_{24} & 0 & 0 \\ d_{31} & d_{32} & d_{33} & 0 & 0 & 0 \end{pmatrix}$$

Assuming that optical axes X, Y, Z are determined with respect to crystal axes a, b, c as shown in FIG. 2, $d_{31}$ is a nonlinear optical constant effecting the extraction of a wavelength-converted wave which is Z-polarized when light which is linearly polarized in the direction X (X-polarized light) is applied as a fundamental wave. Similarly, $d_{32}$ is a nonlinear optical constant effecting the extraction of a wavelength-converted wave which is Z-polarized when light which is linearly polarized in the direction Y (Y-polarized light) is applied as a fundamental wave. Likewise, $d_{33}$ is a nonlinear optical constant effecting the extraction of a wavelength-converted wave which is Z-polarized when light which is linearly polarized in the direction Z (Z-polarized light) is applied as a fundamental wave. $d_{24}$ is a nonlinear optical constant effecting the extraction of a Y-polarized wavelength-converted wave when Y- and Z-polarized fundamental waves are applied. $d_{15}$ is a nonlinear optical constant effecting the extraction of an X-polarized wavelength-converted wave when X- and Z-polarized fundamental waves are applied. The magnitudes of the respective nonlinear optical constants are given in the following table:

|         | (1) | (2) |
|---------|-----|-----|
| $d_{31}$ | 26  | —   |
| $d_{32}$ | 160 | 240 ± 140 |
| $d_{33}$ | 67  | 70 ± 10 |
| $d_{15}$ | 26  | —   |
| $d_{24}$ | 160 | —   |

Figure 3:
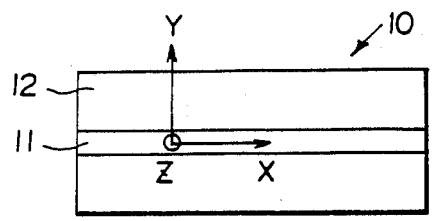
FIG. 3 is a schematic view showing a process of manufacturing the optical wavelength converter device shown in FIG. 1.

The values in the column (1) are obtained by an X-ray crystal structure analysis and the values in the column (2) are measured by the Marker Fringe process (both are of values with respect to a fundamental wave having a wavelength of 1.064 μm, with their unit being $[\times 10^{-9}$ esu$]$ in both columns. The cladding 12 is made of SF8 glass and has an outside diameter of about 5 mm. The core 11 has a diameter of 1 μm. A process of manufacturing the optical wavelength converter device 10 will be described below. A hollow glass fiber 12' which will serve as the cladding 12 is provided, the hollow glass fiber 12' being made of SF8 glass and having an outside diameter of about 5 mm and the hollow space therein having a diameter of about 1 μm. As shown in FIG. 3, PRA is kept as a molten solution 11' in a furnace, and one end of the glass fiber 12' is immersed in the molten solution 11'. Then, the molten solution 11' of PRA enters the hollow space in the glass fiber 12' due to capillarity. The molten solution 11' is kept at a temperature slightly higher than the melting point (102° C.) of PRA in order to prevent the PRA from being decomposed. Thereafter, the glass fiber 12' is quickly cooled to cause the PRA in the hollow space to be polycrystallized.

Then, the optical fiber 12' is gradually pulled from the furnace which is kept at the temperature (e.g., 102.5° C.) higher than the melting point of PRA into an outer space which is kept at a temperature lower than that melting point, for thereby causing the molten PRA to be monocrystallized continuously at the point where it is withdrawn from the furnace. The core 11 thus prepared is of highly long monocrystalline form over 50 mm or longer with a uniform crystal orientation. The optical wavelength converter device 10 is therefore made sufficiently long. Since the wavelength conversion efficiency of the optical wavelength converter device of this type is proportional to the length of the device, as is well known in the art, the longer the optical wavelength converter device, the greater the practical value of the device.

Figure 4:
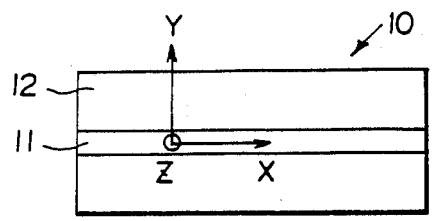
FIG. 4 is a schematic view showing a crystal orientation of a core of the optical wavelength converter device shown in FIG. 1.
Figure 5:
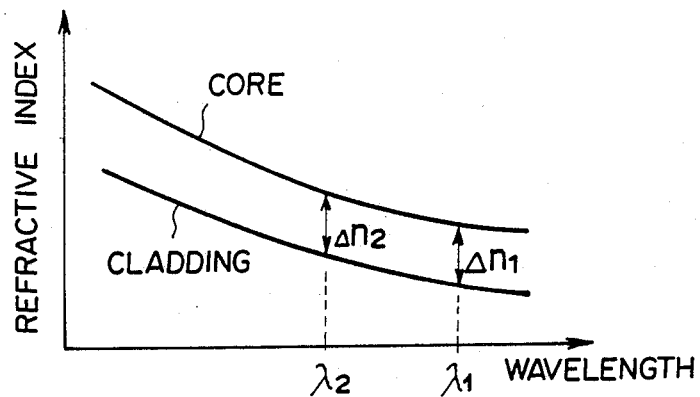
FIG. 5 is a graph showing the relationship between the wavelength-dependent refractive indexes of the core and cladding.
Figure 6:
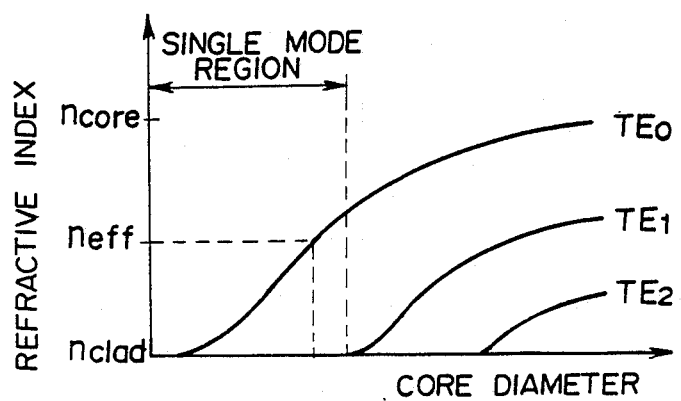
FIG. 6 is a graph illustrating a mode distribution of an optical fiber used in the present invention.

After the core 11 is filled in the glass fiber 11', the crystal orientation thereof such that the c-axis (the optical axis of X) of the crystal extends along the core axis as shown in FIG. 4.

In order to monocrystallize PRA, the method using the Bridgman process as disclosed in Japanese Patent Application No. 61-075078 filed by the applicant may be employed. The glass fiber 11' may be pulled out at a rate of 5 mm/h, for example.

When the core 11 is filled in the glass fiber 11', the opposite ends of the glass fiber 11' are suitably cut off to form an optical wavelength converter device 10 which is 10 mm long.

The optical wavelength converter device 10 will be used as shown in FIG. 1. A laser beam (first fundamental wave) 21 having a wavelength $\lambda_1 = 1300$ nm emitted from a first semiconductor laser 20 is converted by a collimator lens 22 into a parallel beam which is passed through a beam splitter 25. A laser beam (second fundamental wave) 31 having a wavelength $\lambda_2 = 800$ nm emitted from a second semiconductor laser 30 is also converted by a collimator lens 32 into a parallel beam which is applied to and reflected by the beam splitter 25. The first and second fundamental waves 21, 31 are therefore combined into a single beam by the beam splitter 25. The first and second fundamental waves 21, 31 may instead be combined into a single beam by a dichroic mirror or the like. The combined fundamental waves 21, 31 are converged by a condenser lens 26 into a small beam spot that is applied to an end face 11a of the core 11. In this manner, the fundamental waves 21, 31 enter the core 11. As an example, the first semiconductor laser 20 may be a semiconductor laser having an output power of 100 mW for use in optical communications, and the second semiconductor laser 30 may be a semiconductor laser having an output power of 80 mW for use in an optical disc player.

The first and second fundamental waves 21, 31 which have entered the core 11 are converted by the nonlinear optical material of PRA into waves 21', 31' having second harmonics of the fundamentals of the waves 21, 31 and a wave having a frequency which is the sum of the frequencies of the fundamental waves 21, 31. The first semiconductor laser 20 is arranged such that the linearly polarized light of the first fundamental wave 21 is directed along the Y-axis, and the second semiconductor laser 30 is arranged such that the linearly polarized light of the second fundamental wave 31 is directed along the Z-axis. Therefore, the nonlinear optical constant $d_{32}$ effects the conversion of the first fundamental wave 21 to the second harmonic wave 21' exhibiting red and having a wavelength $\lambda_1/2 = 650$ nm. The nonlinear optical constant $d_{33}$ effects the conversion of the second fundamental wave 31 to the second harmonic wave 31' exhibiting blue and having a wavelength $\lambda_2/2 = 400$ nm. The fundamentals 21, 31 are also converted to a wave 41 having a sum frequency and exhibiting green, and the conversion is effected by under the nonlinear optical constant $d_{24}$, the wave 41 having a wavelength $\lambda_3 = 495$ nm $(1/\lambda_3 = 1/\lambda_1 + 1/\lambda_2)$. Assuming that the intensity of the electric field of the Y-polarized first fundamental wave 21 is indicated by $E_Y^{\omega 1}$ and the intensity of the electric field of the Z-polarized second fundamental wave 31 by $E_Z^{\lambda 2}$, the polarization $P_Z^{2\omega 1}$ of the Z-polarized second harmonic wave 21', the polarization $P_Z^{2\omega 2}$ of the Z-polarized second harmonic wave 31', and the polarization $P_Y^{\omega 1+\omega 2}$ of the Y-polarized sum-frequency wave 41 are expressed as follows:

$$P_Z^{2\omega 1} = d_{32}(E_Y^{\omega 1})^2 = d_{ZYY}(E_Y^{\omega 1})^2$$

$$P_Z^{2\omega 2} = d_{33}(E_Z^{\omega 2})^2 = d_{ZZZ}(E_Z^{\omega 2})^2$$

$$P_Y^{\omega 1+\omega 2} = d_{24}E_Y^{\omega 1}E_Z^{\omega 2} = d_{YZY}E_Y^{\omega 1}E_Z^{\omega 2}$$

Phase matching between the above converted waves waves will be described below. The refractive index $n_Y^{\omega 1}$ of the PRA of the core 11 with respect to the first fundamental wave 21 ($\lambda_1 = 1300$ nm: Y-polarized), the refractive index $n_Z^{\omega 2}$ of the PRA of the core 11 with respect to the second fundamental wave 31 ($\lambda_2 = 300$ nm: Z-polarized), the refractive index $n_{clad}^{2\omega 1}$ of the SF8 glass of the cladding 12 with respect to the second harmonic wave 21', the refractive index $n_{clad}^{2\omega 2}$ of the SF8 glass with respect to the second harmonic wave 31', and the refractive index $n_{clad}^{\omega 1+\omega 2}$ of the SF8 glass with respect to the sum-frequency wave 41, are as follows:

| PRA | SF8 glass |
|---|---|
| $n_Y^{w1}$ = 1.76 | $n_{clad}^{2w1}$ = 1.683 |
| $n_Z^{w2}$ = 1.70 | $n_{clad}^{2w2}$ = 1.731 |
|  | $n_{clad}^{w1+w2}$ = 1.703 |

The refractive indexes $n_{eff}^{\omega 1}$, $n_{eff}^{\omega 2}$ of the core 11 with respect to the first and second fundamental waves 21, 31 when the core diameter is 1 μm and the cladding diameter is about 5 mm, are 1.68.

Under the above conditions, the equation (1) is established when $\theta^{\omega 1+\omega 2}$ = about 10°, the equation (3) is established when $\theta^{2\omega 1}$ = about 3°, and the equation (4) is established when $\theta^{2\omega 2}$ = about 14°. As described above, since the radiation mode of the wavelength-converted wave radiated into the cladding and travelling in a radiation mode has a continuous spectrum the above radiation angles $\theta^{\omega 1+\omega 2}$, $\theta^{2\omega 1}$, $\theta^{2\omega 2}$ are all realized, and the phase matching conditions of the equations (1), (3), and (4) are all satisfied.

Consequently, the red light beam 21' having a wavelength of 650 nm which is the second harmonic wave of the first fundamental wave 21, the green light beam 41 having a wavelength of 495 nm which has the frequency equal to the sum of the frequencies of the first and second fundamental waves 21, 31, and the blue light beam 31' having a wavelength of 400 nm which is the second harmonic wave of the second fundamental wave 31 can be extracted with high intensity from an end face 10b of the device 10. These three light beams 21', 31', 41 are emitted in a mixed condition from the end face 10b of the device 10, and can be separated from each other by being passed through filters or by being processed in other ways. By employing light beams having respective wavelengths of 1300 nm and 900 nm, in particular, as the first and second fundamental waves, wavelength-converted waves of three primaries, i.e., red, blue, and green having respective wavelengths of 650 nm, 450 nm, and 532 nm can be produced as the second harmonic waves and sum-frequency wave of the first and second fundamental waves.

In the above embodiment, the first fundamental wave 21 having a wavelength of 1300 nm and the second fundamental wave 31 having a wavelength of 800 nm are guided in a single mode. The mode field diameters of the first and second fundamental waves 21, 31, respectively, are 2 μm and 3 μm, respectively, which are sufficiently large as compared with their wavelengths. It is easy to converge the fundamental waves 21, 31 to these diameters with the condenser lens 26, and hence the fundamental waves 21, 31 can easily enter the device 10.

In the above embodiment, the device 10 simultaneously produces three wavelength-converted waves which are two second harmonic waves and sum-frequency wave of the two fundamental waves having different wavelengths. However, since the cladding of the optical wavelength-converter device of the invention is made of an amorphous material which has a wide range of selectable refractive indexes and selectable wavelength-dependent refractive index dispersions, desired nonlinear constants (e.g., $d_{32}$, $d_{33}$, $d_{31}$, and the like) can be employed, and the aforesaid phase matching conditions (1) through (4) can easily be satisfied. Therefore, it is easy to selectively meet one or two or more of the phase matching conditions (1) through (4), so that desired wavelength-converted waves can be obtained. Examples of the fundamental wave wavelengths, the cladding material, the refractive index of the cladding, the effective refractive indexes of the core, and the diameter of the core will be described below:

For extracting two second harmonic waves by meeting the phase matching conditions (3) and (4):

The wavelengths of the fundamental waves are $\lambda_1 = 1300$ nm and $\lambda_2 = 800$ nm. The cladding is made of SF15 glass and has a diameter of 2 mm. The core is made of PRA and has a diameter of 1.0 μm. Only the nonlinear constant $d_{32}$ of the PRA effects the extraction, and the refractive indexes thereof are $n_{core}^{\omega 1} = 1.76$ and $n_{core}^{\omega 2} = 1.79$. When the above fundamental waves are applied in the form of Y-polarized light, two Z-polarized secondary harmonic waves can simultaneously be produced.

For extracting a sum-frequency wave and one second harmonic wave by meeting the phase matching conditions (1) and (3) or (1) and (4):

The wavelengths of the fundamental waves are $\lambda_1 = 1300$ nm and $\lambda_2 = 800$ nm. The cladding is made of SF5 glass and has a diameter of 5 mm. The core is made of PRA and has a diameter of 1.1 μm. Only nonlinear constant $d_{33}$ of the PRA effects the conversion of the fundamental wave with the wavelength $\lambda_2$ to the second harmonic wave, and $d_{24}$ effects the extraction of the sum-frequency wave. The refractive indexes of the PRA are $n_{core}{}^{\omega 1} = 1.76$ and $n_{core}{}^{\omega 2} = 1.70$. When the fundamental wave with the wavelength $\lambda_1$ is applied as Y-polarized light and the fundamental wave with the wavelength $\lambda_2$ is applied as Z-polarized light, the second harmonic wave can be produced as Z-polarized light and the sum-frequency wave can be produced as Y-polarized light. By maximizing the power of the fundamental wave with $\lambda_1 = 1300$ nm and minimizing the power of the fundamental wave with $\lambda_2 = 800$ nm, the power of the second harmonic wave can be reduced and the power of the sum-frequency wave can be increased.

For extracting a sum-frequency wave, a differential-frequency wave, and one second harmonic wave by meeting the phase matching conditions (1), (2) and (3) or (1), (2) and (4):

The wavelengths of the fundamental waves are $\lambda_1 = 1300$ nm and $\lambda_2 = 800$ nm. The cladding is made of SF8 glass and has a diameter of 5 mm. The core is made of PRA and has a diameter of 1.4 μm. Only the nonlinear constant $d_{33}$ of the PRA effects the conversion of the fundamental wave with the wavelength $\lambda_2$ to the second harmonic wave, and $d_{24}$ effects the extraction of the sum- and differential-frequency waves. The refractive indexes of the PRA are $n_{core}{}^{\omega 1} = 1.76$ and $n_{core}{}^{\omega 2} = 1.70$. When the fundamental wave with the wavelength $\lambda_1$ is applied as Y-polarized light and the fundamental wave with the wavelength $\lambda_2$ is applied as Z-polarized light, both second harmonic waves can be produced as Z-polarized light and the sum- and differential-frequency waves can be produced as Y-polarized light. The wavelength of the sum-frequency wave is 495 nm, whereas the wavelength of the differential frequency wave is 2080 nm.

For extracting sum- and differential-frequency waves and two second harmonic waves by meeting the phase matching conditions (1), (2), (3) and (4):

The wavelengths of the fundamental waves are $\lambda_1 = 1300$ nm and $\lambda_2 = 800$ nm. The cladding is made of SF8 glass and has a diameter of 5 mm. The core is made of PRA and has a diameter of 1.8 μm. The nonlinear constant $d_{32}$ of the PRA effects the conversion of the fundamental wave with the wavelength $\lambda_1$ to the second harmonic wave, $d_{33}$ effects the conversion of the fundamental wave with the wavelength $\lambda_2$ to the second harmonic wave, and $d_{24}$ effects the extraction of the sum- and differential-frequency waves. The refractive indexes of the PRA are $n_{core}{}^{\omega 1} = 1.76$ and $n_{core}{}^{\omega 2} = 1.70$. When the fundamental wave with the wavelength $\lambda_1$ is applied as Y-polarized light and the fundamental wave with the wavelength $\lambda_2$ is applied as Z-polarized light, both second harmonic waves can be produced as Z-polarized light and the sum- and differential-frequency waves can be produced as Y-polarized light. The waveguide mode for the fundamental wave with the wavelength $\lambda_1$ is a first mode.

An optical wavelength converter device of the optical waveguide type according to another embodiment of the present invention will be described with reference to FIGS. 7, 8 and 9. The optical wavelength converter device, generally designated at 110, is a three-dimensional optical waveguide device comprising a flat substrate 112A, a substrate 112B placed on the substrate 112A and having a single groove of rectangular cross section defined in a surface thereof facing the substrate 112A, and a crystal of a nonlinear organic material filled as an optical waveguide 111 in the groove and having a refractive index higher than those of the substrates 112A, 112B. The optical wavelength converter device 110 is arranged to produce wavelength-converted waves of three colors, i.e., red, green, and blue in response to a first fundamental wave having a wavelength of 1300 nm and a second fundamental wave having a wavelength of 800 nm which are applied to the device 110. The optical waveguide 111 is made of PRA. The PRA of the optical waveguide 111 has a crystal orientation with its c-axis extending along the longitudinal direction of the waveguide 111. The bulk crystal structure of the PRA is illustrated in FIG. 2.

The substrates 112A and 112B are made of SF8 glass and have a thickness of about 5 mm. The optical waveguide 111 has a width of 1 μm and a thickness of 1 μm.

A process of manufacturing the optical wavelength converter device 110 will be described below.

Two glass substrates 112A, 112B are prepared which are made of SF8 glass and each have a thickness of about 5 mm. As shown in FIG. 8, PRA is kept as a molten solution 111' in a furnace, and one end of the facing substrates 12A, 112B with a hollow space H having a cross-sectional shape of 1 μm × 1 μm therebetween is immersed in the molten solution 111'. Then, the molten solution 111' of PRA enters the hollow space H between the substrates 112A, 112B due to capillarity. Thereafter, the substrates 112A, 112B are quickly cooled to cause the PRA in the hollow space H to be polycrystallized.

Then, the substrates 112A, 112B are gradually pulled from the furnace which is kept at the temperature (e.g., 102.5° C.) higher than the melting point of PRA into an outer space which is kept at a temperature lower than that melting point, for thereby causing the molten PRA to be monocrystallized continuously at the point where it is withdrawn from the furnace. The optical waveguide 111 thus prepared is of highly long monocrystalline form over 50 mm or longer with a uniform crystal orientation. The optical wavelength converter device 110 is therefore made sufficiently long.

Figure 9:
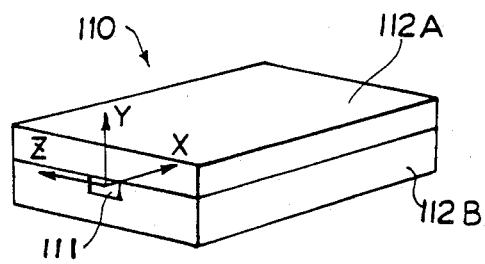
FIG. 9 is a perspective view showing a crystal orientation of an optical waveguide of the optical wavelength converter device shown in FIG. 7.
Figure 10:
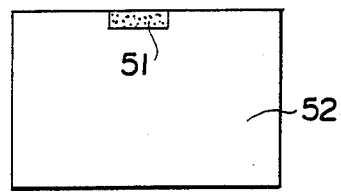
FIGS. 10 through 15 are schematic cross-sectional views of optical wavelength converter devices of the optical waveguide type according to other embodiments of the present invention.
Figure 11:
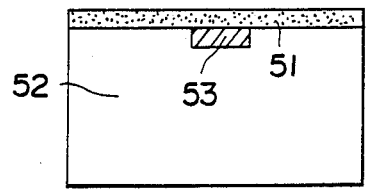
Figure 12:
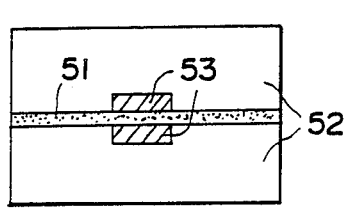
Figure 13:
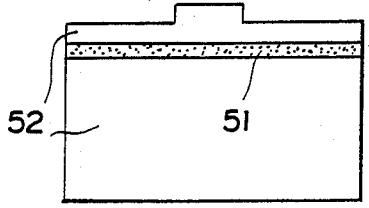
Figure 14:
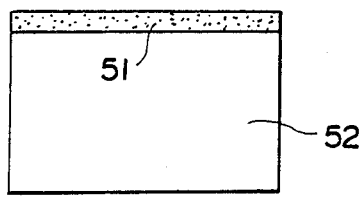

When the PRA is filled as a monocrystallized form between the glass substrates 112A, 112B, the crystal orientation thereof is such that the c-axis (the optical axis of X) of the crystal extends along the longitudinal direction of the waveguide as shown in FIG. 9.

After the optical waveguide 111 is formed between the glass substrates 112A, 112B, the opposite ends of the substrates 112A, 112B are suitably cut off to form an optical wavelength converter device 110 which is 10 mm long.

Figure 7:
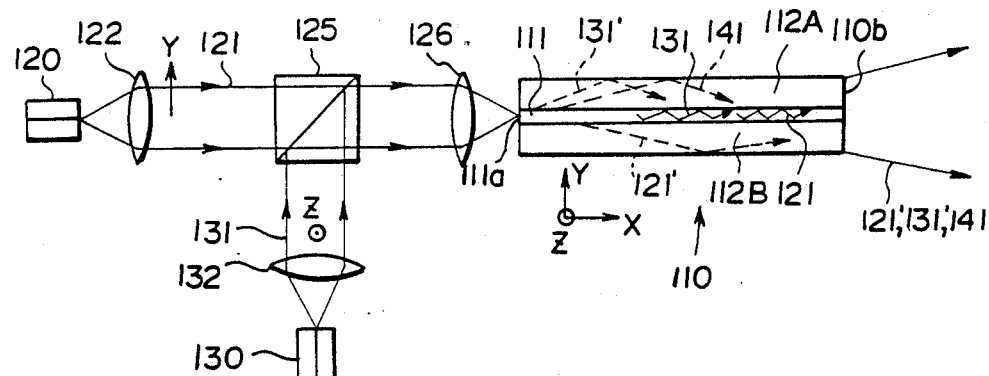
FIG. 7 is a schematic side elevational view of an optical wavelength converter device of the optical waveguide type according to another embodiment of the present invention.
Figure 8:
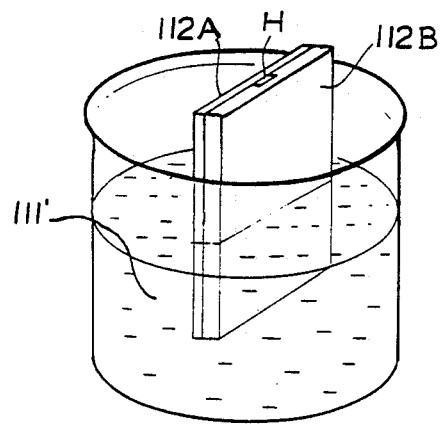
FIG. 8 is a schematic view showing a process of manufacturing the optical wavelength converter device shown in FIG. 7.

The optical wavelength converter device 110 will be used as shown in FIG. 7. A laser beam (first fundamental wave) 121 having a wavelength $\lambda_1 = 1300$ nm emitted from a first semiconductor laser 120 is converted by a collimator lens 122 into a parallel beam which is passed through a beam splitter 125. A laser beam (second fundamental wave) 131 having a wavelength $\lambda_2 = 800$ nm emitted from a second semiconductor laser 130 is also converted by a collimator lens 132 into a parallel beam which is applied to and reflected by the beam splitter 125. The first and second fundamental waves 121, 131 are therefore combined into a single beam by the beam splitter 125. The combined fundamental waves 121, 131 are converged by a condenser lens 126 into a small beam spot that is applied to an end face 111a of the optical waveguide 111. In this manner, the fundamental waves 121, 131 enter the optical waveguide 111.

The first and second fundamental waves 121, 131 which have entered the optical waveguide 111 are converted by the nonlinear optical material of PRA into waves 121', 131' having second harmonics of the fundamentals of the waves 121, 131 and a wave having a frequency which is the sum of the frequencies of the fundamental waves 121, 131. The first semiconductor laser 120 is arranged such that the linearly polarized light of the first fundamental wave 121 is directed along the Y-axis, and the second semiconductor laser 130 is arranged such that the linearly polarized light of the second fundamental wave 131 is directed along the Z-axis. Therefore, the nonlinear optical constant $d_{32}$ effects the conversion of the first fundamental wave 121 is converted to the second harmonic wave 121' exhibiting red and having a wavelength $\lambda_2/2=650$ nm. The nonlinear optical constant $d_{33}$ effects the conversion of the second fundamental wave 131 to the second harmonic wave 131' exhibiting blue and having a wavelength $\lambda_2/2=400$ nm. The fundamentals 121, 131 are also converted to a wave 141 having a sum frequency and exhibiting green and the conversion is effected by nonlinear optical constant $d_{24}$, the wave 141 having a wavelength $\lambda_3=495$ nm $(1/\lambda_1+1/\lambda_2)$. The polarizations of the Z-polarized second harmonic wave 121', the Z-polarized second harmonic wave 131', and the Y-polarized sum-frequency wave 141 are the same as those described above with reference to the embodiment shown in FIG. 1.

Phase matching between the above converted waves waves will be described below. The refractive index $n_Y^{\omega 1}$ of the PRA of the optical waveguide 111 with respect to the first fundamental wave 121 ($\lambda_1=1300$ nm: Y-polarized), the refractive index $n_Z^{\omega 2}$ of the PRA of the optical waveguide 111 with respect to the second fundamental wave 131 ($\lambda_2=300$ nm: Z-polarized), the refractive index $n_{clad}^{2\omega 1}$ of the SF8 glass of the substrates 112 with respect to the second harmonic wave 121', the refractive index $n_{clad}^{2\omega 2}$ of the SF8 glass with respect to the second harmonic wave 131', and the refractive index $n_{clad}$ of the SF8 glass with respect to the sum-frequency wave 141, are the same as those described with reference to the embodiment of FIG. 1. The effective refractive indexes $n_{eff}^{\omega 1}$, $n_{eff}^{\omega 2}$ of the optical waveguide 111 with respect to the first and second fundamental waves 121, 131 when the thickness of the optical waveguide is 5 μm and the thickness of the substrates 112A, 112B is about 5 mm, are 1.68.

Under the above conditions, the equation (1) is established when $\theta^{\omega 1+\omega 2}=$about 10°, the equation (3) is about 10°, the equation (3) is established when $\theta^{2\omega 1}=$about 3°, and the equation (4) is established when $\theta^{2\omega 2}=$about 14°. As described above, since the wavelength-converted wave radiated into the cladding and travelling in a radiation mode, has a continuous spectrum, the above radiation angles $\theta^{\omega 1+\omega 2}$, $\theta^{2\omega 1}$, $\theta^{2\omega 2}$ are all realized, and the phase matching conditions of the equations (1), (3), and (4) are all satisfied.

Consequently, the red light beam 121' having a wavelength of 650 nm which is the second harmonic wave of the first fundamental wave 121, the green light beam 141 having a wavelength of 495 nm which has the frequency equal to the sum of the frequencies of the first and second fundamental waves 121, 131, and the blue light beam 131' having a wavelength of 400 nm which is the second harmonic wave of the second fundamental wave 131 can be extracted with high intensity from an end face 101b of the device 110. By employing light beams having respective wavelengths of 1300 nm and 900 nm as the first and second fundamental waves also in this embodiment, wavelength-converted waves of three primaries, i.e., red, blue, and green having respective wavelengths of 650 nm, 450 nm, and 532 nm can be produced as the second harmonic waves and sum-frequency wave of the first and second fundamental waves.

In the above second embodiment, the first fundamental wave 121 having a wavelength of 1300 nm and the second fundamental wave 131 having a wavelength of 800 nm are guided in a single mode. The mode field diameters of the first and second fundamental waves 121, 131, respectively, are 2 μm×2 μm and 3 μm, respectively, which are sufficiently large as compared with their wavelengths. It is easy to converge the fundamental waves 121, 131 to these diameters with the condenser lens 126, and hence the fundamental waves 121, 131 can easily enter the device 110.

Since the substrates of the optical wavelength converter device of the invention are made of an amorphous material which has a wide range of selectable refractive indexes and selectable wavelength-dependent refractive index dispersions, the aforesaid phase matching conditions (1) through (4) can easily be satisfied. Therefore, it is easy to selectively meet one or two or more of the phase matching conditions (1) through (4), so that desired wavelength-converted waves can be obtained. Examples of the fundamental wave wavelengths, the substrate material, the refractive index of the substrate, the effective refractive indexes of the optical waveguide, and the thickness of the optical waveguide will be described below:

For extracting two second harmonic waves by meeting the phase matching conditions (3) and (4):

The wavelengths of the fundamental waves are $\lambda_1=1300$ nm and $\lambda_2=800$ nm. The substrates are made of SF15 glass and has a thickness of 2 mm. The optical waveguide is made of PRA and has cross sectional dimensions of 1 μm×1 μm. Only the nonlinear constant $d_{32}$ of the PRA effects the extraction, and the refractive indexes thereof are $n_Y^{\omega 1}=1.76$ and $n_Y^{\omega 2}=1.79$. When the above fundamental waves are applied in the form of Y-polarized light, two Z-polarized secondary harmonic waves can simultaneously be produced.

For extracting a sum-frequency wave and one second harmonic wave by meeting the phase matching conditions (1) and (3) or (1) and (4):

The wavelengths of the fundamental waves are $\lambda_1=1300$ nm and $\lambda_2=800$ nm. The substrates are made of SF5 glass and have a thickness of 5 mm. The optical waveguide is made of PRA and has cross-sectional dimensions of 1.1 μm×1.1 μm. The nonlinear constant $d_{33}$ of the PRA effects the conversion of the fundamental wave with the wavelength $\lambda_2$ to the second harmonic wave, and $d_{24}$ effects the extraction of the sum-frequency wave. The refractive indexes of the PRA are $n_Y^{\omega 1}=1.76$ and $n_Z^{\omega 2}=1.70$. When the fundamental wave with the wavelength $\lambda_1$ is applied as Y-polarized light and the fundamental wave with the wavelength $\lambda_2$ is applied as Z-polarized light, the second harmonic wave can be produced as Z-polarized light and the sum-frequency wave can be produced as Y-polarized light. By maximizing the power of the fundamental wave with $\lambda_1=1300$ nm and minimizing the power of the fundamental wave with $\lambda_2=800$ nm, the power of the second harmonic wave can be reduced and the power of the sum-frequency wave can be increased.

For extracting a sum-frequency wave, a differential-frequency wave, and one second harmonic wave by meeting the phase matching conditions (1), (2) and (3) or (1), (2) and (4):

The wavelengths of the fundamental waves are $\lambda_1=1300$ nm and $\lambda_2=800$ nm. The substrates are made of SF8 lass and have a thickness of 5 mm. The optical waveguide is made of PRA and has cross-sectional dimensions of 1.4 $\mu$m $\times$ 1.4 $\mu$m. The nonlinear constant $d_{33}$ of the PRA effects the conversion of the fundamental wave with the wavelength $\lambda_2$ to the second harmonic wave, and $d_{24}$ effects the extraction of the sum- and differential-frequency waves. The refractive indexes of the PRA are $n_Y^{\omega 1}=1.76$ and $n_Z^{\omega 2}=1.70$. When the fundamental wave with the wavelength $\lambda_1$ is applied as Y-polarized light and the fundamental wave with the wavelength $\lambda_2$ is applied as Z-polarized light, both second harmonic waves can be produced as Z-polarized light and the sum- and differential-frequency waves can be produced as Y-polarized light. The wavelength of the sum-frequency wave is 495 nm, whereas the wavelength of the differential frequency wave is 2080 nm.

For extracting sum- and differential-frequency waves and two second harmonic waves by meeting the phase matching conditions (1), (2), (3) and (4):

The wavelengths of the fundamental waves are $\lambda_1=1300$ nm and $\lambda_2=800$ nm. The substrates are made of SF8 glass and have a thickness of 5 mm. The optical waveguide is made of PRA and has cross-sectional dimensions of 1.8 $\mu$m $\times$ 1.8 $\mu$m. The nonlinear constant $d_{32}$ of the PRA effects the conversion of the fundamental wave with the wavelength $\lambda_1$ to the second harmonic wave, $d_{33}$ effects the extraction of the fundamental wave with the wavelength $\lambda_2$ to the second harmonic wave, and $d_{24}$ effects the extraction of the sum- and differential-frequency waves. The refractive indexes of the PRA are $n_Y^{\omega 1}=1.76$ and $n_Z^{\omega 2}=1.70$. When the fundamental wave with the wavelength $\lambda_1$ is applied as Y-polarized light and the fundamental wave with the wavelength $\lambda_2$ is applied as Z-polarized light, both second harmonic waves can be produced as Z-polarized light and the sum- and differential-frequency waves can be produced as Y-polarized light. The waveguide mode for the fundamental wave with the wavelength $\lambda_1$ is a first mode.

Figure 15:
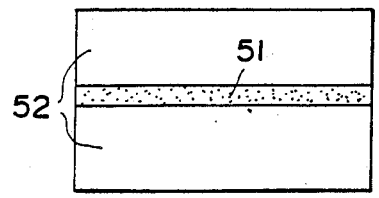

The optical wavelength converter device of the aforesaid embodiment is formed as a three-dimensional optical waveguide device as shown in FIG. 9. The optical wavelength converter device according to the present invention may be formed as three- or two-dimensional optical waveguide devices of other types. FIGS. 10 through 15 show such optical waveguide devices of other designs FIGS. 10 through 15 illustrate cross sections of these devices taken along planes normal to the direction in which a guided wave travels through the optical waveguide device. In each of FIGS. 10 through 15, 51 represents a region filled up with a nonlinear optical material, 52 a substrate, and 53 a region having a refractive index which is intermediate between the refractive index of the nonlinear optical material and the refractive index of the substrate material. The device shown in FIG. 10 has a three-dimensional optical waveguide 51 on a surface of a single substrate 52. In each of the devices shown in FIGS. 11 and 12, a region 53 of an intermediate refractive index is provided to make a two-dimensional optical waveguide 51 three-dimensional. The device shown in FIG. 13 includes a ridge on an upper substrate 52 to render a two-dimensional waveguide 51 three-dimensional. The device illustrated in FIG. 14 has a two-dimensional optical waveguide formed on a surface of a single substrate 52. In the device of FIG. 15, a two-dimensional optical waveguide is formed between two substrates 52.

One example of the optical waveguide of the type shown in FIG. 15 for satisfying the phase matching conditions (1), (2) and (3) will be described below.

The wavelengths of the fundamental waves are $\lambda_1=1300$ nm and $\lambda_2=800$ nm. The substrates 52 are made of SF10 glass and each have a thickness of 2 mm. The optical waveguide is made of PRA and has a thickness of 1.0 $\mu$m. Only the nonlinear constant $d_{32}$ of the PRA effect the extraction of wave length converted waves, and the refractive indexes thereof are $n_Y^{\omega 1}=1.76$ and $n_Y^{\omega 2}=1.79$. When the above fundamental waves are applied in the form of Y-polarized light, a Z-polarized sum-frequency wave and two Z-polarized secondary harmonic waves can simultaneously be produced.

The nonlinear optical material of which the optical waveguide is made should preferably be an organic nonlinear optical material having a large nonlinear optical constant. One preferred example of such a material, other than PRA, is a nonlinear optical material (3,5-dimethyl-1-(4-nitrophenyl)-1,2,4-triazole) represented by the following molecular diagram:

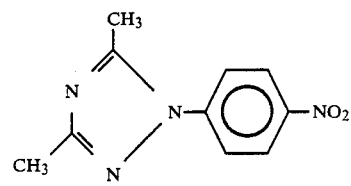

With the arrangement of the present invention, as described above, an optical wavelength converter device is formed as a device of the Cherenkov radiation type in which a wavelength-converted wave radiated into cladding or a substrate in a particular mode has a continuous spectrum. The cladding or the substrate is made of an amorphous material for which a refractive index and a wavelength-dependent refractive index dispersion can be selected with great freedom. The optical wavelength converter device can guide two fundamental waves with different wavelengths in a single mode, and allows the conditions for achieving phase matching between the wavelength-converted waves and the fundamental waves to be easily met. The optical wavelength converter device can therefore extract a sum-frequency wave having a frequency equal to the sum of frequencies of two fundamental waves, or a differential-frequency wave having a frequency equal to the difference between frequencies of two fundamental waves, or both sum- and differential-frequency waves, or two second harmonic waves having second harmonics of the fundamentals of two fundamental waves, or two second harmonic waves and a sum-frequency wave, or two second harmonic waves and a differential-frequency wave, or the like.

Since the optical wavelength converter device of the invention is of the optical fiber type or the optical waveguide type, it is possible to increase the power of two fundamental waves to be applied to the device and also to sufficiently increase the interaction length of the device. Therefore, the optical wavelength converter device can have high wavelength conversion efficiency.

Inasmuch as the cladding or the substrate of the optical wavelength converter device is made of an amorphous material for which a refractive index and a wavelength-dependent refractive index dispersion can be selected with great freedom, as described above, the mode field diameter can be selected with greater freedom, and the application of fundamental waves to the device can be facilitated by increasing the mode field diameter.

Although certain preferred embodiments have been shown and described, it should be understood that many changes and modifications may be made therein without departing from the scope of the appended claims.

We claim:

1. An optical wavelength converter device comprising:
   (i) cladding means having a first refractive index; and
   (ii) core means of a nonlinear optical material disposed in said cladding means and having a second refractive index higher than said first refractive index, said core means for converting first and second fundamental waves having different wavelengths being applied to said core means into a sum-frequency wave having a frequency equal to the sum of frequencies of the first and second fundamental waves, and for radiating the converted wave into said cladding means, with phase matching being achieved between the sum-frequency wave radiated into said cladding means and travelling in a radiation mode and a nonlinear polarized wave in said core means which is produced by the first and second fundamental waves travelling through said core means in a waveguide mode.

2. An optical wavelength converter device comprising:
   (i) cladding means having a first refractive index; and
   (ii) core means of a nonlinear optical material disposed in said cladding means and having a second refractive index higher than said first refractive index, said core means for converting first and second fundamental waves having different wavelengths being applied to said core means into a differential-frequency wave having a frequency equal to the difference between frequencies of the first and second fundamental waves, and for radiating the converted wave into said cladding means, with phase matching being achieved between the differential-frequency wave radiated into said cladding means and travelling in a radiation mode and a nonlinear polarized wave in said core means which is produced by the first and second fundamental waves travelling through said core means in a waveguide mode.

3. An optical wavelength converter device comprising:
   (i) cladding means having a first refractive index; and
   (ii) core means of a nonlinear optical material disposed in said cladding means and having a second refractive index higher than said first refractive index, said core means for converting first and second fundamental waves having different wavelengths being applied to said core means into a sum-frequency wave having a frequency equal to the sum of frequencies of the first and second fundamental waves, and a differential-frequency wave having a frequency equal to the difference between frequencies of the first and second fundamental waves, and for radiating the converted wave into said cladding means, with phase matching being achieved between the sum- and differential-frequency waves radiated into said cladding means and travelling in a radiation mode and a nonlinear polarized wave in said core means when is produced by the first and second fundamental wave travelling through said core means in a waveguide mode.

4. An optical wavelength converter device according to claim 1, 2 or 3, wherein one of said first and second fundamental waves is converted into a second harmonic wave having a second harmonic of the fundamental of said one fundamental wave, said second harmonic wave and at least one of said sum-frequency wave and said differential-frequency wave being radiated into said cladding means, with phase matching being achieved between said second harmonic wave radiated into said cladding means and travelling in a radiation mode and said fundamental waves travelling through said core means in a waveguide mode.

5. An optical wavelength converter device according to claim 1, 2 or 3, wherein said first and second fundamental waves are converted into respective second harmonic waves having second harmonics of the fundamentals of said fundamental waves, said second harmonic waves and at least one of said sum-frequency wave and said differential-frequency wave being radiated into said cladding means, with phase matching being achieved between said second harmonic waves radiated into said cladding means and travelling in a radiation mode and said fundamental waves travelling through said core means in a waveguide mode.

6. An optical wavelength converter device comprising:
   (i) cladding means having a first refractive index; and
   (ii) core means of a nonlinear optical material disposed in said cladding means and having a second refractive index higher than said first refractive index, said core means for converting first and second fundamental waves having different wavelengths being applied to said core means into second harmonic waves having second harmonics of the fundamentals of said fundamental waves, and for radiating the converted waves into said cladding means, with phase matching being achieved between the second harmonic waves radiated into said cladding means and travelling in a radiation mode and the first and second fundamental waves travelling through said core means in a waveguide mode.

7. An optical wavelength converter device comprising a two- or three-dimensional optical waveguide device comprising:
   (i) amorphous substrate means having a first refractive index; and
   (ii) optical waveguide means of a nonlinear optical material crystal grown on or in said amorphous substrate means and having a second refractive index higher than said first refractive index, said optical waveguide means for converting first and second fundamental waves having different wavelengths being applied to said optical waveguides means into a sum-frequency wave having a frequency equal to the sum of frequencies of the first and second fundamental waves, and for radiating the converted wave into said substrate means, with phase matching being achieved between the sum-frequency wave radiated into said substrate means and travelling in a radiation mode and a nonlinear polarized wave in said optical waveguide means which is produced by the first and second fundamental waves travelling through said optical waveguide means in a waveguide mode.

8. An optical wavelength converter device comprising a two- or three-dimensional optical waveguide device comprising:
(i) amorphous substrate means having a first refractive index; and
(ii) optical waveguide means of a nonlinear optical material crystal grown on or in said amorphous substrate means and having a second refractive index higher than said first refractive index said optical waveguide means, for converting first and second fundamental waves having different wavelengths being applied to said optical waveguides means into a differential-frequency wave having a frequency equal to the difference of frequencies of the first and second fundamental waves, and for radiating the converted wave into said substrate means, with phase matching being achieved between the sum-frequency wave radiated into said substrate means and travelling in a radiation mode and a nonlinear polarized wave in said optical waveguide means which is produced by the first and second fundamental waves travelling through said optical waveguide means in a waveguide mode.

9. An optical wavelength converter device comprising a two- or three-dimensional optical waveguide device comprising:
(i) amorphous substrate means having a first refractive index; and
(ii) optical waveguide means of a nonlinear optical material crystal grown on or in said amorphous substrate means and having a second refractive index higher than said first refractive index, said optical waveguide means for converting first and second fundamental waves having different wavelengths being applied to the optical waveguide into a sum-frequency wave having a frequency equal to the sum of frequencies of the first and second fundamental waves, and a differential-frequency wave having a frequency equal to the difference of frequencies of the first and second fundamental waves, and for radiating the converted wave into said substrate means, with phase matching being achieved between the sum-frequency wave radiated into said substrate means and travelling in a radiation mode and a nonlinear polarized wave in said optical waveguide means which is produced by the first and second fundamental waves travelling through said optical waveguide means in a waveguide mode.

10. An optical wavelength converter device accordingly to claim 7, 8 or 9, wherein one of said first and second fundamental waves is converted into a second harmonic wave having a second harmonic of the fundamental of said one fundamental wave, said second harmonic wave and at least one of said sum-frequency wave and said differential-frequency wave being radiated into said substrate means, with phase matching being achieved between said second harmonic wave radiated into said substrate means and travelling in a radiation mode and said fundamental waves travelling through said optical waveguide means in a waveguide mode.

11. An optical wavelength converter device according to claim 7, 8 or 9, wherein said first and second fundamental waves are converted into respective second harmonic waves having second harmonics of the fundamentals of said fundamental waves, said second harmonic waves and at least one of said sum-frequency wave and said differential-frequency wave being radiated into said substrate means, with phase matching being achieved between said second harmonic waves radiated into said substrate means and travelling in a radiation mode and said fundamental waves travelling through said optical waveguide means in a waveguide mode.

12. An optical wavelength converter device comprising a two- or three-dimensional optical waveguide device comprising:
(i) amorphous substrate means having a first refractive index; and
(ii) optical waveguide means of a nonlinear optical material crystal grown on or in said amorphous substrate means and having a second refractive index higher than said first refractive index, said optical waveguides means for converting first and second fundamental waves having different wavelengths applied to the optical waveguide means into second harmonic waves having second harmonics of the fundamentals of said fundamental waves, and for radiating the converted waves into said substrate means, with phase matching being achieved between the second harmonic waves radiated into said substrate means and travelling in a radiation mode and a nonlinear polarized wave in said optical waveguide means which is produced by the first and second fundamental waves travelling through said optical waveguide means in a waveguide mode.

* * * * *